(12) United States Patent
Chang et al.

(10) Patent No.: US 10,478,932 B1
(45) Date of Patent: Nov. 19, 2019

(54) MACHINING CENTER

(71) Applicant: Buffalo Machinery Company Limited, Taichung (TW)

(72) Inventors: Paul Chang, Taichung (TW); Chia-Hui Tang, Taichung (TW); Hsun-Fu Chiang, Taichung (TW)

(73) Assignee: Buffalo Machinery Company Limited, Taichung (TW)

( * ) Notice: Subject to any disclaimer, the term of this patent is extended or adjusted under 35 U.S.C. 154(b) by 0 days.

(21) Appl. No.: 16/403,989

(22) Filed: May 6, 2019

(30) Foreign Application Priority Data

Nov. 7, 2018 (TW) .............................. 107215163 U

(51) Int. Cl.
| | |
|---|---|
| *B23Q 7/18* | (2006.01) |
| *B23Q 11/08* | (2006.01) |
| *B23Q 1/66* | (2006.01) |
| *B23Q 1/01* | (2006.01) |

(52) U.S. Cl.
CPC .............. *B23Q 7/18* (2013.01); *B23Q 1/015* (2013.01); *B23Q 1/66* (2013.01); *B23Q 11/08* (2013.01)

(58) Field of Classification Search
CPC .......... B23Q 1/015; B23Q 1/66; B23Q 3/105; B23Q 7/16; B23Q 7/18; B23Q 11/08
USPC ............ 198/346.1, 345.3; 29/33 P, 563, 564; 414/222.01, 222.04, 225.01, 223.01, 414/223.02, 226.05; 483/14, 15; 409/159, 172, 202, 212
See application file for complete search history.

(56) References Cited

U.S. PATENT DOCUMENTS

| | | | | |
|---|---|---|---|---|
| 4,534,093 A | * | 8/1985 | Jahnke | .................... B23Q 1/26 29/26 A |
| 5,678,291 A | * | 10/1997 | Braun | .................... B23Q 1/015 29/26 A |
| 5,984,085 A | * | 11/1999 | Ponzio | .................... H02K 15/00 198/345.3 |
| 6,200,247 B1 | * | 3/2001 | Braun | .................... B23Q 1/015 29/560 |
| 7,013,544 B2 | * | 3/2006 | Yasuda | ................ B23Q 7/1431 29/27 C |
| 7,213,316 B2 | * | 5/2007 | Kato | .................... B23Q 1/0009 198/346.1 |
| 7,721,398 B2 | | 5/2010 | Bernhard et al. | |
| 8,562,497 B2 | * | 10/2013 | Tanizaki | ................ B23Q 1/015 29/560 |

(Continued)

FOREIGN PATENT DOCUMENTS

EP        1747843        2/2012

*Primary Examiner* — Joseph A Dillon, Jr.
(74) *Attorney, Agent, or Firm* — Akerman LLP; Peter A. Chiabotti

(57) ABSTRACT

A machining center includes a machine bed, a work table unit, a sliding unit, a first driving unit, a conveying member, a second driving unit and a loading seat. The machine bed has a machining zone and a transferring zone. The first driving unit is operable for driving the conveying member to move along a conveying axis which extends in a first direction, thereby driving the loading seat to move along first adjusting axes which extend in the first direction between the transferring and machining zones. The second driving unit is operable for driving the loading seat to move along second adjusting axes which extend in a second direction, which is perpendicular to the first direction and which is substantially vertical.

5 Claims, 12 Drawing Sheets

(56) References Cited

U.S. PATENT DOCUMENTS

| | | | | |
|---|---|---|---|---|
| 8,733,221 | B2 * | 5/2014 | Takahashi | B23C 3/30 198/345.3 |
| 10,293,442 | B2 * | 5/2019 | Chen | B23Q 1/015 |
| 2006/0054459 | A1 * | 3/2006 | Farmer | B29C 65/7861 198/345.3 |
| 2006/0236515 | A1 * | 10/2006 | Kurt | B23Q 1/4842 29/33 P |
| 2007/0022591 | A1 * | 2/2007 | Bernhard | B23Q 1/012 29/33 P |

* cited by examiner

US 10,478,932 B1

MACHINING CENTER

CROSS-REFERENCE TO RELATED APPLICATION

This application claims priority of Taiwanese Patent Application No. 107215163, filed on Nov. 7, 2018.

FIELD

The disclosure relates to a machining center, and more particularly to a machining center capable of transferring workpieces.

BACKGROUND

A conventional machining center disclosed in European Patent No. EP1747843B2 includes a machine bed, a worktable, a slide assembly, a lifting device, a bar guide, a mounting element and a pallet holder. The machine bed has top and bottom surfaces that are opposite to each other. A machining zone and a rear loading zone are defined between the top and bottom surfaces and are arranged along a horizontal direction. The worktable is disposed in the machining zone and is rotatably mounted to the machine bed. The slide assembly is movably mounted to the top surface of the machine bed and is slidable along a first axis that extends in the horizontal direction. The lifting device is disposed in the rear loading zone, is mounted to the machine bed, and telescopically extends along a vertical axis. The bar guide is mounted to the lifting device and extends in the horizontal direction. The mounting element is movably mounted to the bar guide, and is slidable along a second axis that extends in the horizontal direction. The pallet holder is rotatably mounted to the mounting element, and has two holding portions that are disposed at opposite ends thereof.

Prior to a machining process, a workpiece pallet is mounted to one of the holding portions of the pallet holder distal from the machining zone, and the lifting device is operated to move the pallet holder upwardly, thereby raising the workpiece pallet. Next, the mounting element is operated to rotate the pallet holder about the vertical axis by 180 degrees, such that the holding portion carrying the workpiece pallet is now proximate to the machining zone. Then, the mounting element slides along the second axis relative to the bar guide so as to transfer the workpiece pallet from the rear loading zone into the machining zone. After that, the workpiece pallet is lowered by the lifting device and is disposed on the worktable, so that the slide assembly may be operated to actuate the machining process. After the machining process is finished, the workpiece pallet is transferred back to the rear loading zone to be prepared for the next machining process. More specifically, another workpiece pallet is mounted to the other one of the holding portions of the pallet holder so that when the pallet holder is rotated by 180 degrees again, the two workpiece pallets may switch places with each other.

Due to the abovementioned exchanging process of the workpiece pallets, such machining center is designed to accommodate rotation of the pallet holder which may easily take up sizeable amount of space.

SUMMARY

Therefore, the object of the disclosure is to provide a machining center that can alleviate the drawback of the prior art.

According to the disclosure, a machining center includes a machine bed, a work table unit, a sliding unit, a first driving unit, a conveying member, a second driving unit and a loading seat.

The machine bed has a top surface, a bottom surface, a machining zone, a transferring zone and a gate. The bottom surface is opposite to the top surface. The machining and transferring zones are defined between the top and bottom surfaces, and are arranged in a first direction. The gate is disposed between the machining and transferring zones.

The work table unit is mounted in the machining zone of the machine bed.

The sliding unit is mounted to the top surface, is slidable along a sliding axis which extends in the first direction, and includes a tool spindle that is movably disposed above the work table unit.

The first driving unit is mounted in the transferring zone and extends in the first direction.

The conveying member is disposed between the first driving unit and the bottom surface of the machine bed, and is movably mounted to the first driving unit.

The second driving unit is co-movably mounted to the conveying member.

The loading seat is movably mounted to the second driving unit.

The first driving unit is operable for driving the conveying member to move along a conveying axis which extends in the first direction, thereby driving the loading seat to move along first adjusting axes which extend in the first direction between the transferring and machining zones via the gate.

The second driving unit is operable for driving the loading seat to move along second adjusting axes which extend in a second direction, which are perpendicular to the first direction and which are substantially vertical.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
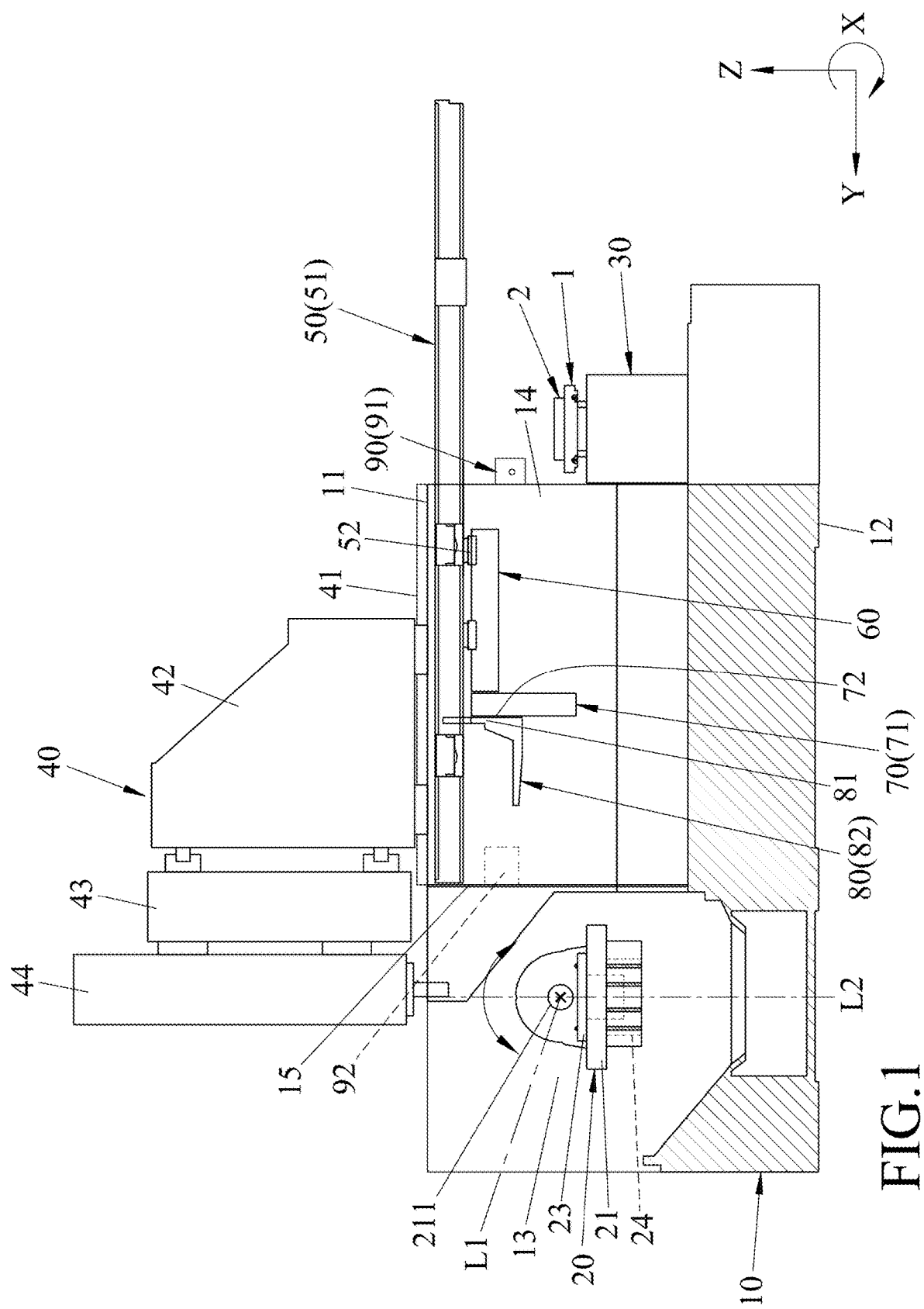
FIG. 1 is a sectional side view of a workpiece, a workpiece pallet and a first embodiment of a machining center according to the present disclosure, illustrating a first driving unit, a second driving unit, a conveying unit and a loading seat of the first embodiment in a transferring zone of a machine bed.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
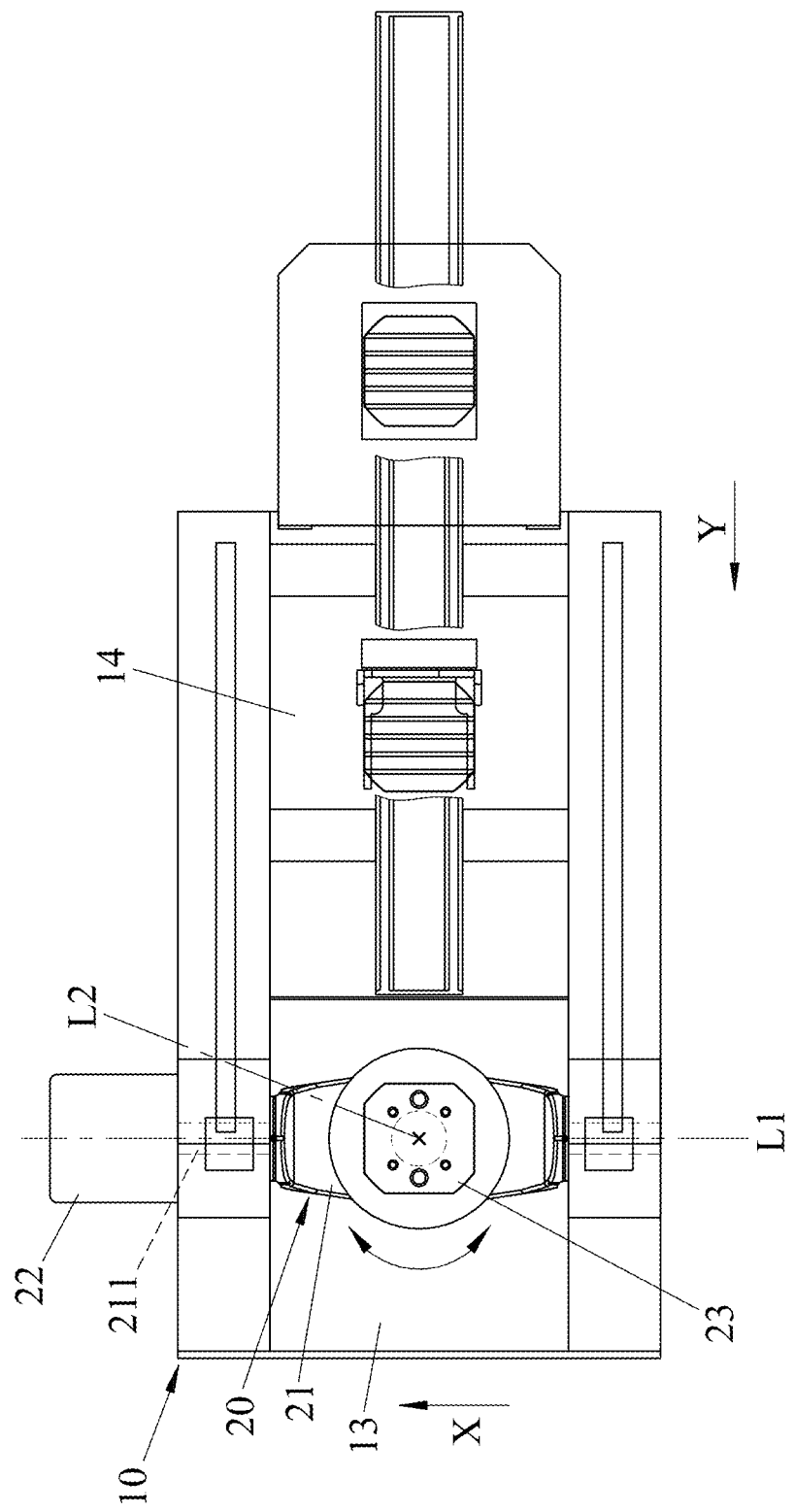
FIG. 2 is a fragmentary top view of the embodiment.

Referring to FIGS. 1 and 2, a first embodiment of a machining center according to the present disclosure is adapted for machining a plurality of workpieces 2 (only one is shown in FIG. 1) in order. The workpieces 2 may be mounted onto a plurality of workpiece pallets 1 (only one is shown in FIG. 1). The machining center includes a machine bed 10, a work table unit 20, a mounting table 30, a sliding unit 40, a first driving unit 50, a conveying member 60, a second driving unit 70, a loading seat 80, and a sensor unit 90.

Figure 9:
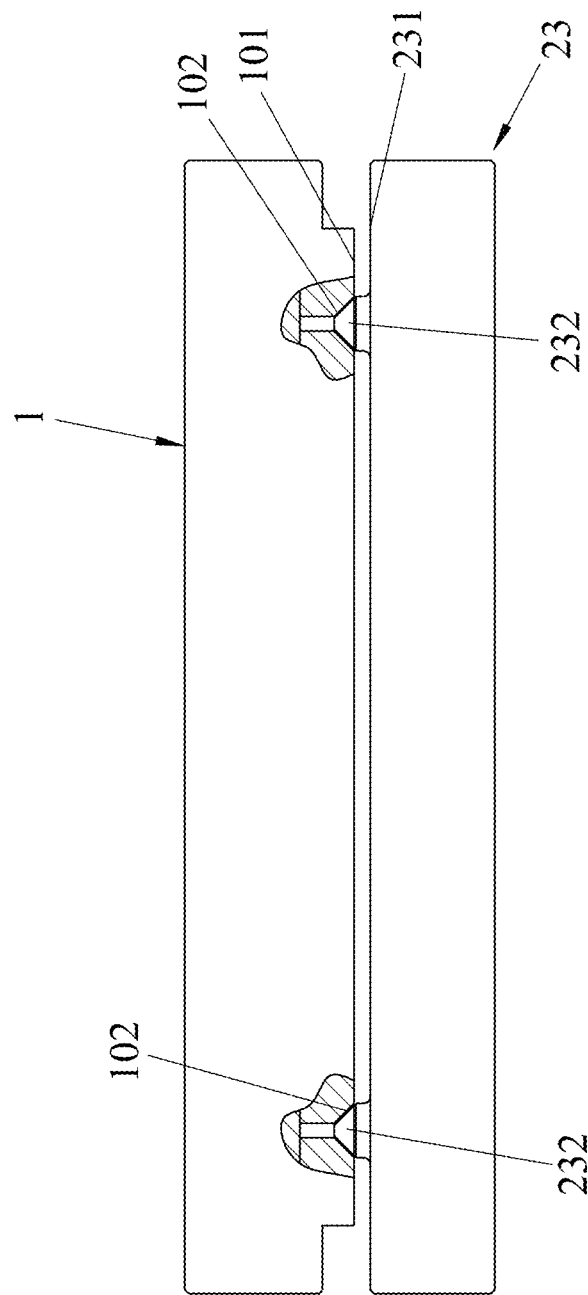
FIG. 9 is a partly sectional side view of the workpiece pallet and the work table, illustrating an engagement between the workpiece pallet and the work table.

Referring further to FIG. 9, each of the workpiece pallets 1 has a bottom end surface 101 formed with a plurality of positioning holes 102. In the present embodiment, the positioning holes 102 are funnel-shaped. Each of the workpieces 2 is disposed on a respective one of the workpiece pallets 1.

The machine bed 10 has a top surface 11, a bottom surface 12, a machining zone 13, a transferring zone 14 and a gate 15. The bottom surface 12 is opposite to the top surface 11. The machining and transferring zones 13, 14 are defined between the top and bottom surfaces 11, 12, and are arranged in a first direction (Y). The gate 15 is disposed between the machining and transferring zones 13, 14.

The work table unit 20 is mounted in the machining zone 13 of the machine bed 10, and includes a base seat 21, a first rotary driver 22, a work table 23 and a second rotary driver 24.

The base seat 21 has a shaft 211 that is rotatably mounted to the machine bed 10 and that extends along a first axis (L1) extending in a third direction (X) which is perpendicular to the first direction (Y). In this embodiment, the shaft 211 has a body segment and two shaft segments that are mounted respectively to opposite ends of the body segment. The first rotary driver 22 is operable for rotating the shaft 211 of the base seat 21 about the first axis (L1), thereby driving the base seat 21 to rotate about the first axis (L1) relative to the machine bed 10. The work table 23 is co-rotatably mounted to the body segment of the base seat 21. The second rotary driver 24 is operable for driving the work table 23 to rotate relative to the base seat 21 about a second axis (L2) that extends substantially in a second direction (Z) which is perpendicular to the first direction (Y) and the third direction (X) and which is substantially vertical.

Referring further to FIG. 9, the work table 23 has a top end surface 231, and a plurality of positioning protrusions 232 connected to the top end surface 231. In the present embodiment, the positioning protrusions 232 are frustoconical. When one of the workpiece pallets 1 is disposed on the work table 23, the positioning protrusions 232 of the work table 23 are engaged with the corresponding positioning holes 102 of the one of the workpiece pallets 1.

In the present embodiment, the mounting table 30 is disposed at an end of the transferring zone 14 that is opposite to the machining zone 13.

The sliding unit 40 includes a slider driver 41, a first slider 42, a second slider 43 and a tool spindle 44. The slider driver 41 is mounted to the top surface 11 of the machine bed 10 and extends in the first direction (Y). The first slider 42 is operable to be driven by the slider driver 41 to slide along a first sliding axis which extends in the first direction (Y). The second slider 43 is movably mounted to the first slider 42, is co-slidable with the first slider 42 along the first sliding axis, and is slidable relative to the first slider 42 along second sliding axes which extend in the third direction (X). The tool spindle 44 is mounted to the second slider 43, is disposed above the work table unit 20, is co-slidable with the second slider 43, and is slidable relative to the second slider 43 along third sliding axes which extend in the second direction (Z). Operational and functional details of the sliding unit 40 are known in the art and are not described in further details herein.

The first driving unit 50 is mounted in the transferring zone 14 and extends in the first direction (Y). In the present embodiment, the first driving unit 50 may be a linear motor and may include a first main body 51 and a first power output 52 that is movable along a conveying axis which extends in the first direction (Y) relative to the first main body 51.

The conveying member 60 is disposed between the first driving unit 50 and the bottom surface 12 of the machine bed 10, and is co-movably mounted to the first power output 52 of the first driving unit 50.

The second driving unit 70 is co-movably mounted to the conveying member 60. In the present embodiment, the second driving unit 70 may be a linear motor or a hydraulic cylinder, and may include a second main body 71 and a second power output 72. The second main body 71 is co-movable with the conveying member 60 along the conveying axis. In this embodiment, the second power output 72 is substantially vertically movable relative to the second main body 71. Specifically, since the position of the second main body 71 in the first direction (Y) may change, the second power output 72 is movable relative to the second main body 71 along second adjusting axes which extend in the second direction (Z).

Figure 10:
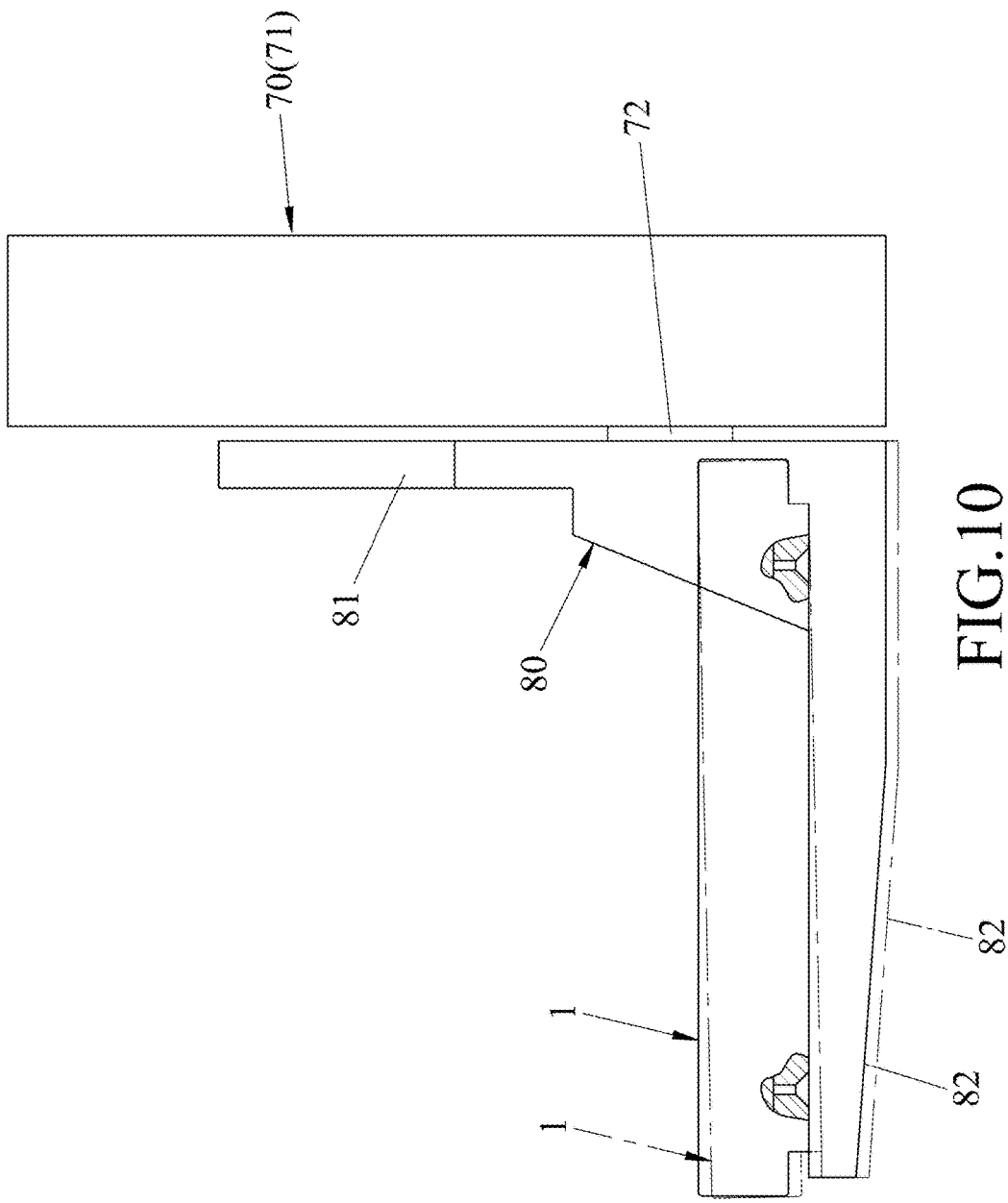
FIG. 10 is a partly sectional side view of the workpiece pallet, the second driving unit and the loading seat, illustrating the bearing portion being deformed due to a weight of the workpiece pallet.

Referring further to FIG. 10, the loading seat 80 is L-shaped, and has an upstanding portion 81 that is co-movably mounted to the second power output 72 of the second driving unit 70, and a bearing portion 82 that is transverse to the upstanding portion 81. As such, during the movement of the first power output 52 along the conveying axis, the loading seat 80 is movable substantially vertically along the second adjusting axes, and is movable together with the second power output 72 along first adjusting axes which extend in the first direction (Y) between the transferring and machining zones 14, 13 of the machine bed 10 via the gate 15.

The sensor unit 90 includes a sensor 91 and a control module 92. The sensor 91 is mounted in the transferring zone 14 of the machine bed 10 for measuring a deformation of the bearing portion 82 of the loading seat 80 toward the bottom surface 12 of the machine bed 10. The control module 92 is electrically connected to the sensor 91 and the first rotary driver 22 of the work table unit 20.

The sensor 91 is capable of sending a signal of the deformation to the control module 92, so that the control module 92 controls the first rotary driver 24 to actuate the rotation of the base seat 21 of the work table unit 20 about the first axis (L1) in accordance therewith.

The following description is provided for a further understanding of the functions, the technical means, and the intended effects of the collaboration of the various components of the disclosure.

Referring to FIG. 1, the loading seat 80 is in the transferring zone 14, is between the gate 15 and the mounting table 30, is at a default position relative to the machine bed 10, and is at an upper position relative to the second driving unit 70.

Figure 3:
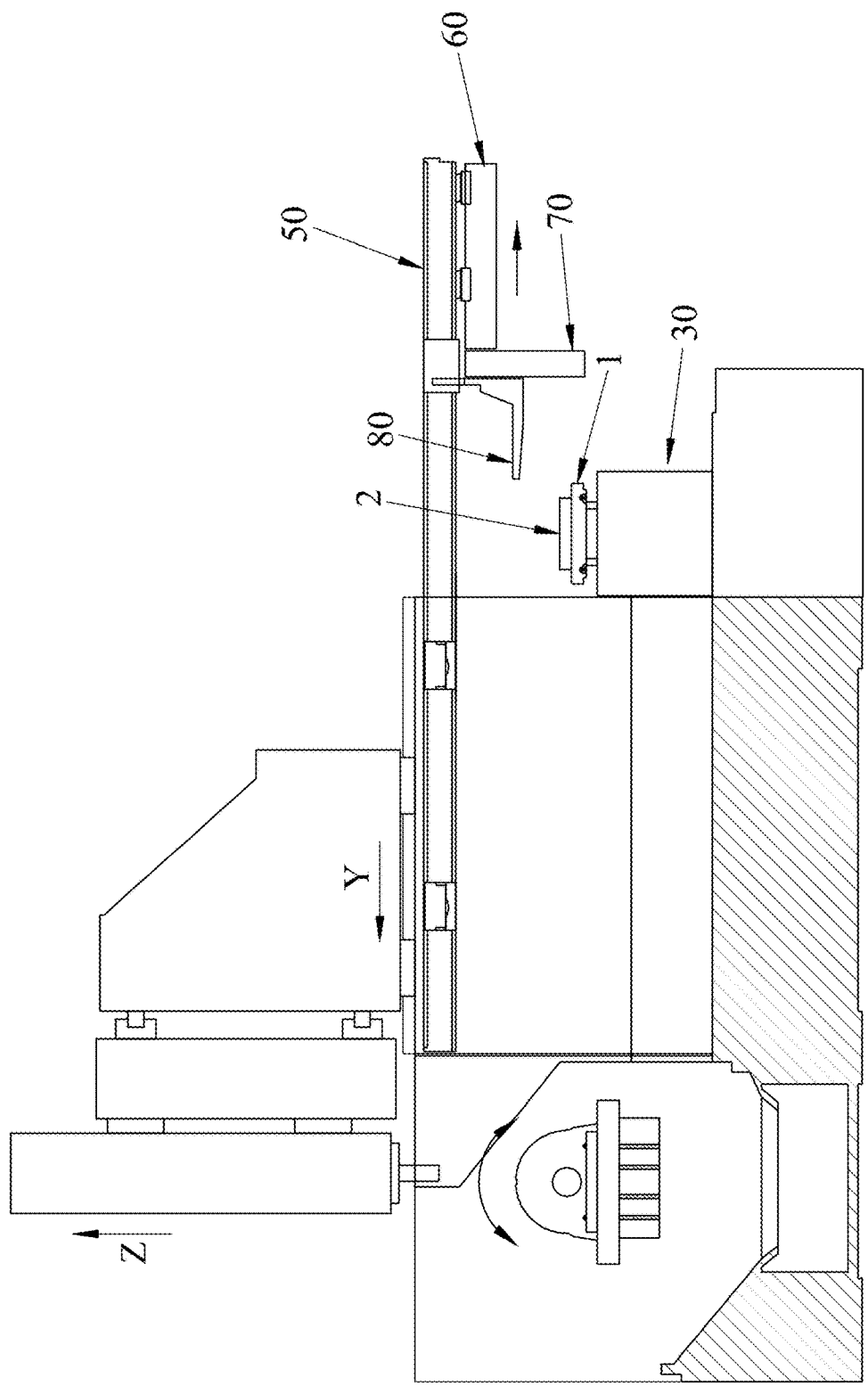
FIG. 3 is another sectional side view illustrating the conveying unit, the second driving unit and the loading seat being driven by the first driving unit to move past a mounting table.

Prior to a machining process, first, one of the workpieces 2 is disposed on one of the workpiece pallets 1, and the abovementioned workpiece pallet 1 is disposed on the mounting table 30. As shown in FIG. 3, the first driving unit 50 is operated to drive the conveying member 60 to move substantially horizontally along the conveying axis, thereby driving the conveying member 60, the second driving unit 70 and the loading seat 80 to move toward and then past the mounting table 30 along the first adjusting axes, that is, to the right of FIG. 3.

Figure 4:
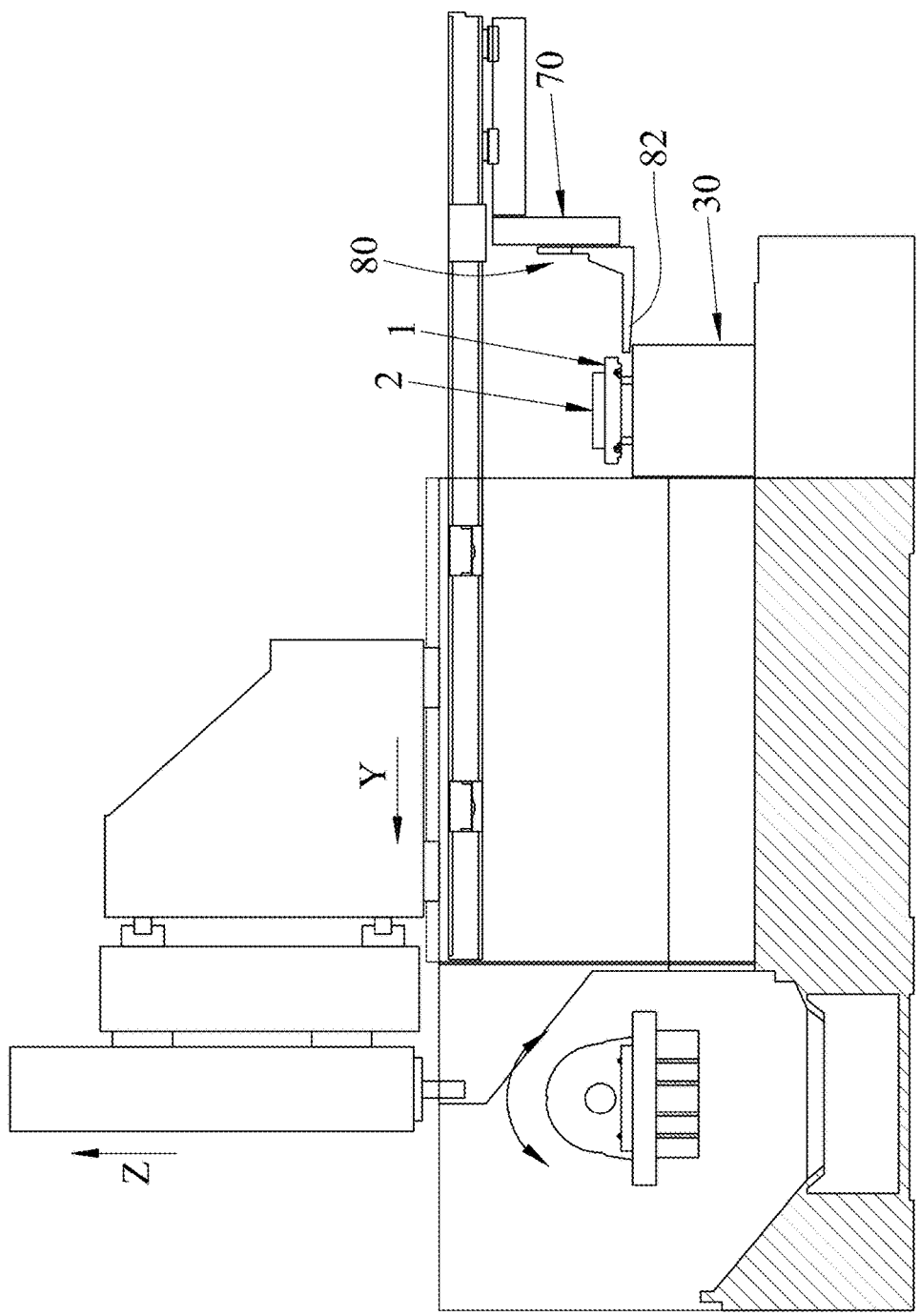
FIG. 4 is yet another sectional side view illustrating the loading seat being driven by the second driving unit to move along a second adjusting axis.

Second, as shown in FIG. 4, the second driving unit 70 is operated to move the loading seat 80 from the upper position to a lower position such that the bearing portion 82 of the loading seat 80 is slightly lower than the workpiece pallet 1.

Figure 5:
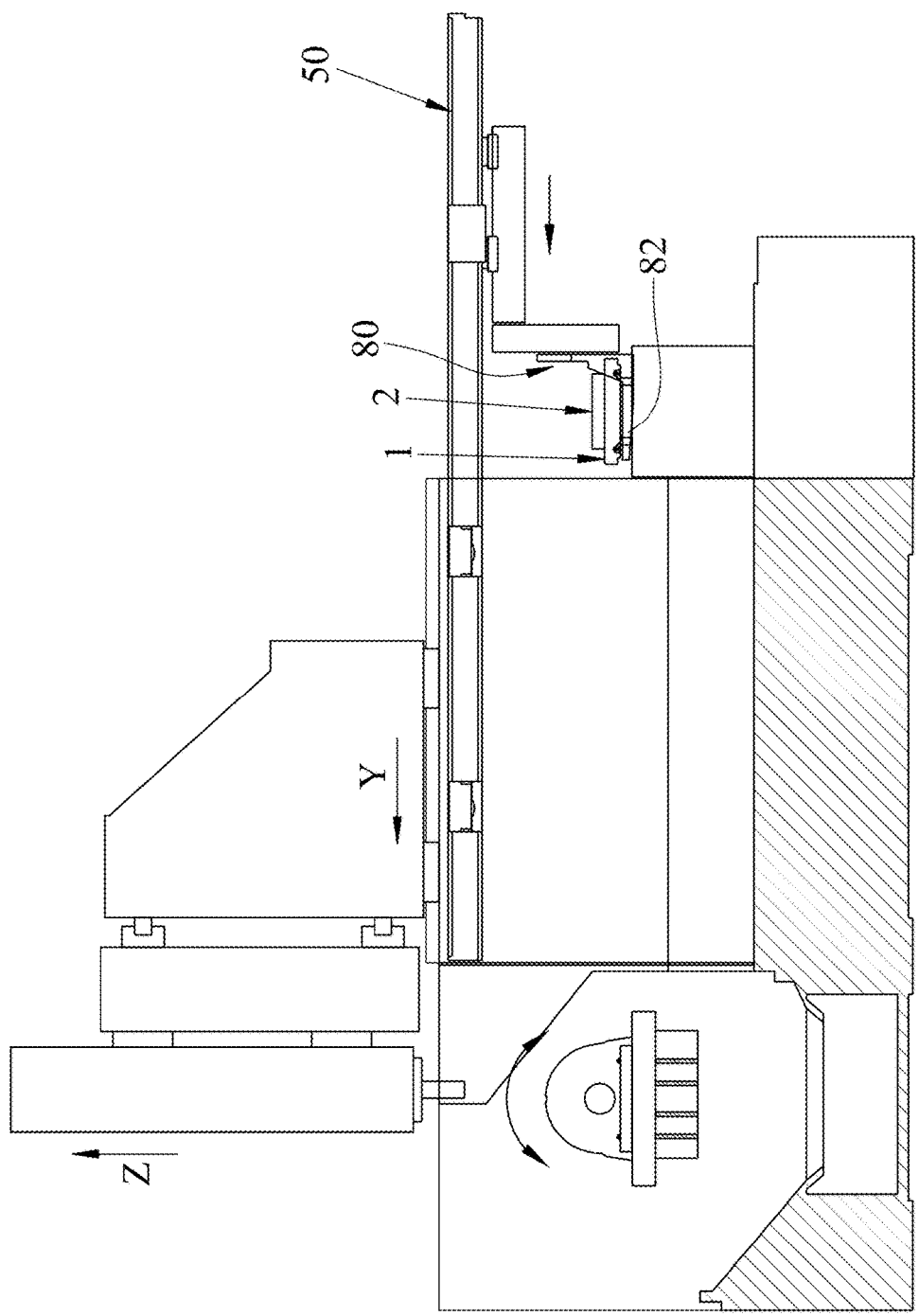
FIG. 5 is yet another sectional side view illustrating the conveying unit, the second driving unit and the loading seat being driven by the first driving unit to move along the conveying axis such that the a bearing portion of the loading seat is under the workpiece pallet.

Next, as shown in FIG. 5, the first driving unit 50 is operated to move the loading seat 80 substantially horizontally, such that the bearing portion 82 of the loading seat 80 is disposed under the workpiece pallet 1.

Figure 6:
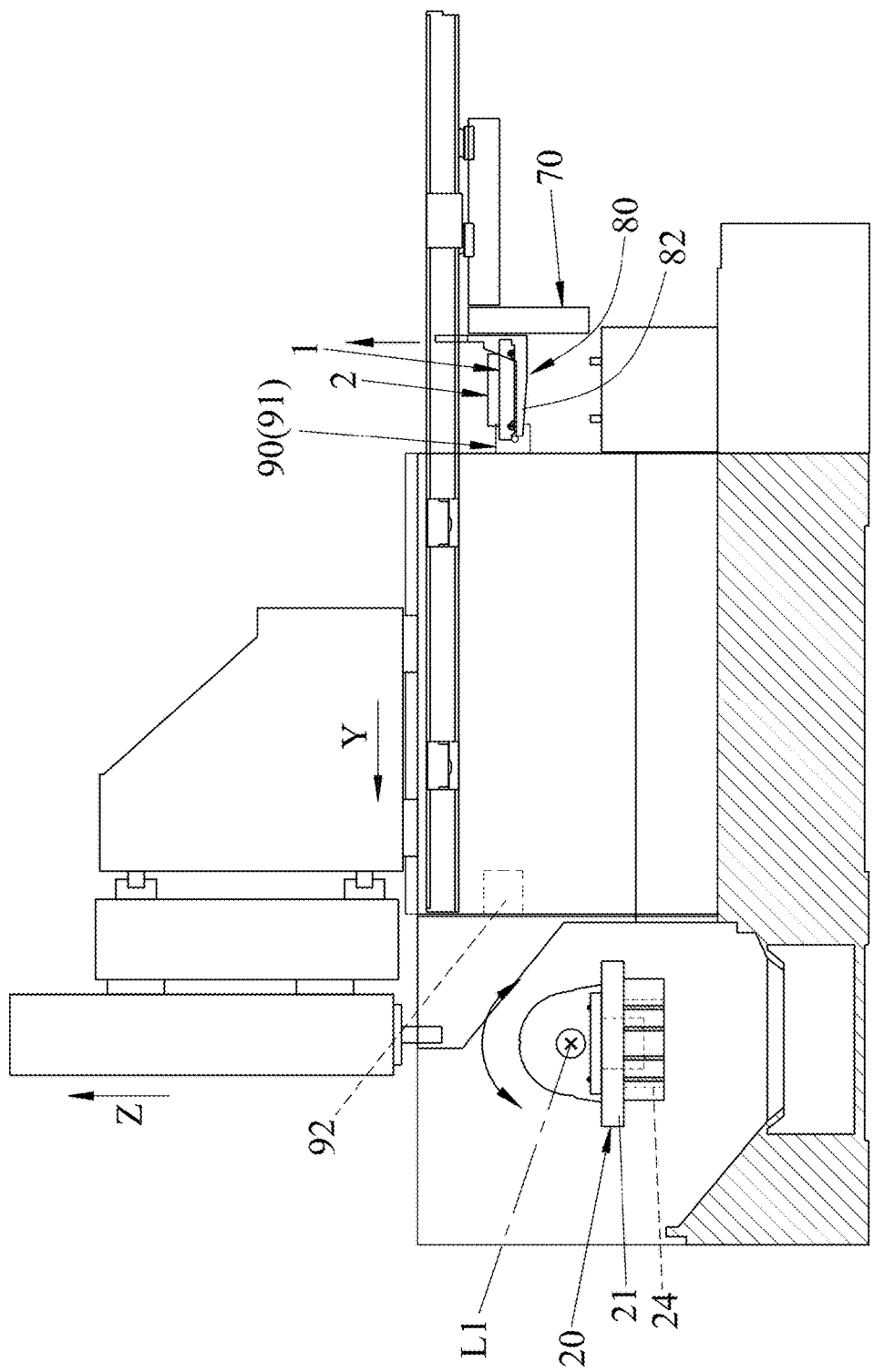
FIG. 6 is yet another sectional side view illustrating the loading seat being driven by the second driving unit to move the workpiece pallet away from the mounting table.

Then, as shown in FIG. 6, the second driving unit 70 is operated to move the loading seat 80 from the lower position to the upper position, thereby raising the workpiece 2 and the workpiece pallet 1 to be away from the mounting table 30.

At this time, the bearing portion 82 of the loading seat 80 is within a sensing range of the sensor 91 of the sensor unit 90. Once the sensor 91 senses the deformation of the bearing portion 82 toward the bottom surface 12 of the machine bed 10 due to the weight of the workpiece pallet 1 and the workpiece 2, the sensor 91 sends the signal of the deformation to the control module 92. As further shown in FIG. 10, the control module 92 then controls the first rotary driver 24 to rotate the base seat 21 of the work table unit 20 about the first axis (L1) in accordance with the deformation of the bearing portion 82.

Figure 7:
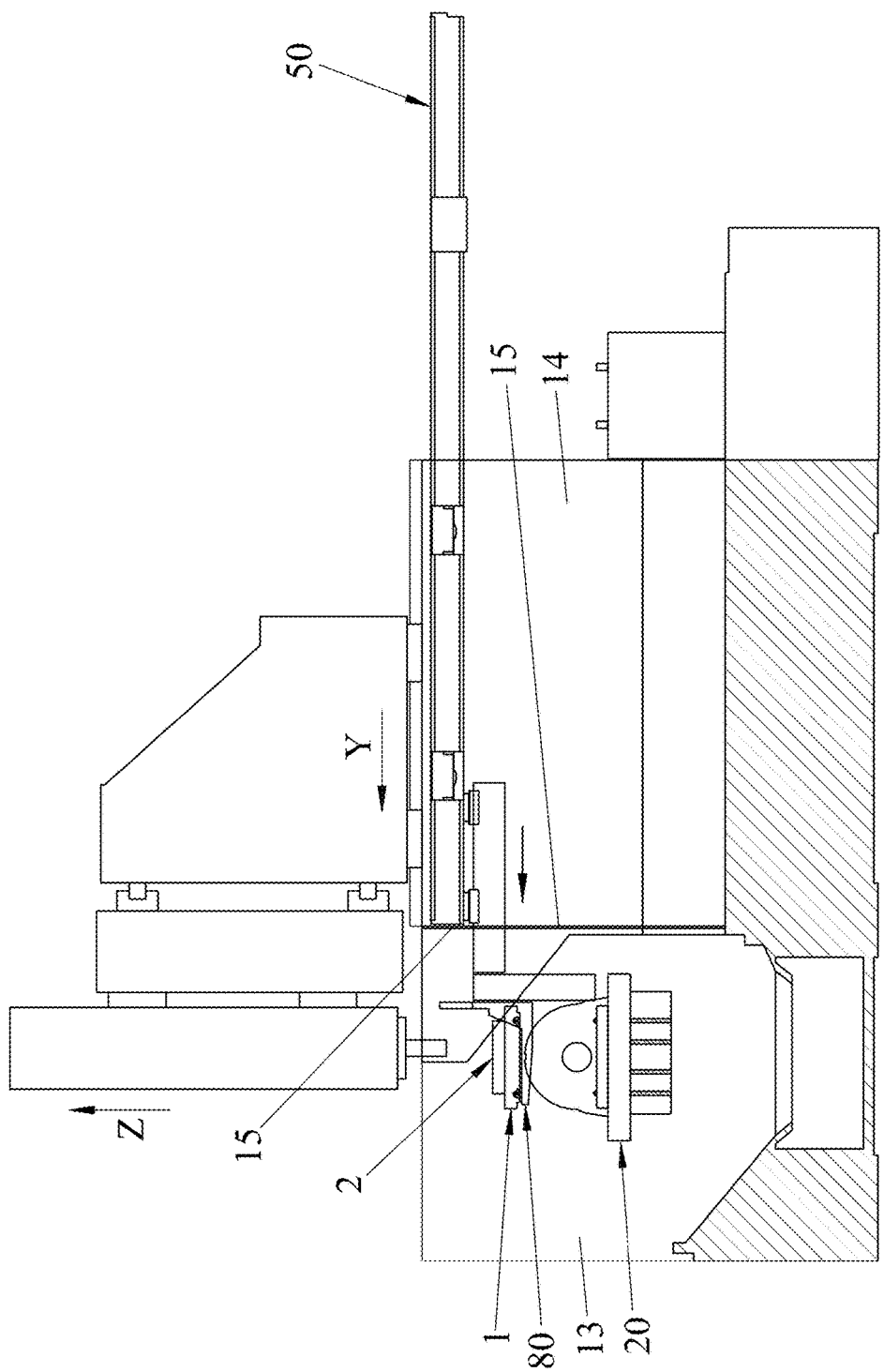
FIG. 7 is yet another sectional side view illustrating the conveying unit, the second driving unit and the loading seat being driven by the first driving unit into the machining zone along the conveying axis, such that the workpiece pallet is above a work table.

Then, as shown in FIG. 7, the first driving unit 50 is operated to move the loading seat 80, the workpiece 2 and the workpiece pallet 1 substantially horizontally into the machining zone 13 via the gate 15 until the workpiece 2 and the workpiece pallet 1 are directly above the work table 23 of the work table unit 20.

Figure 8:
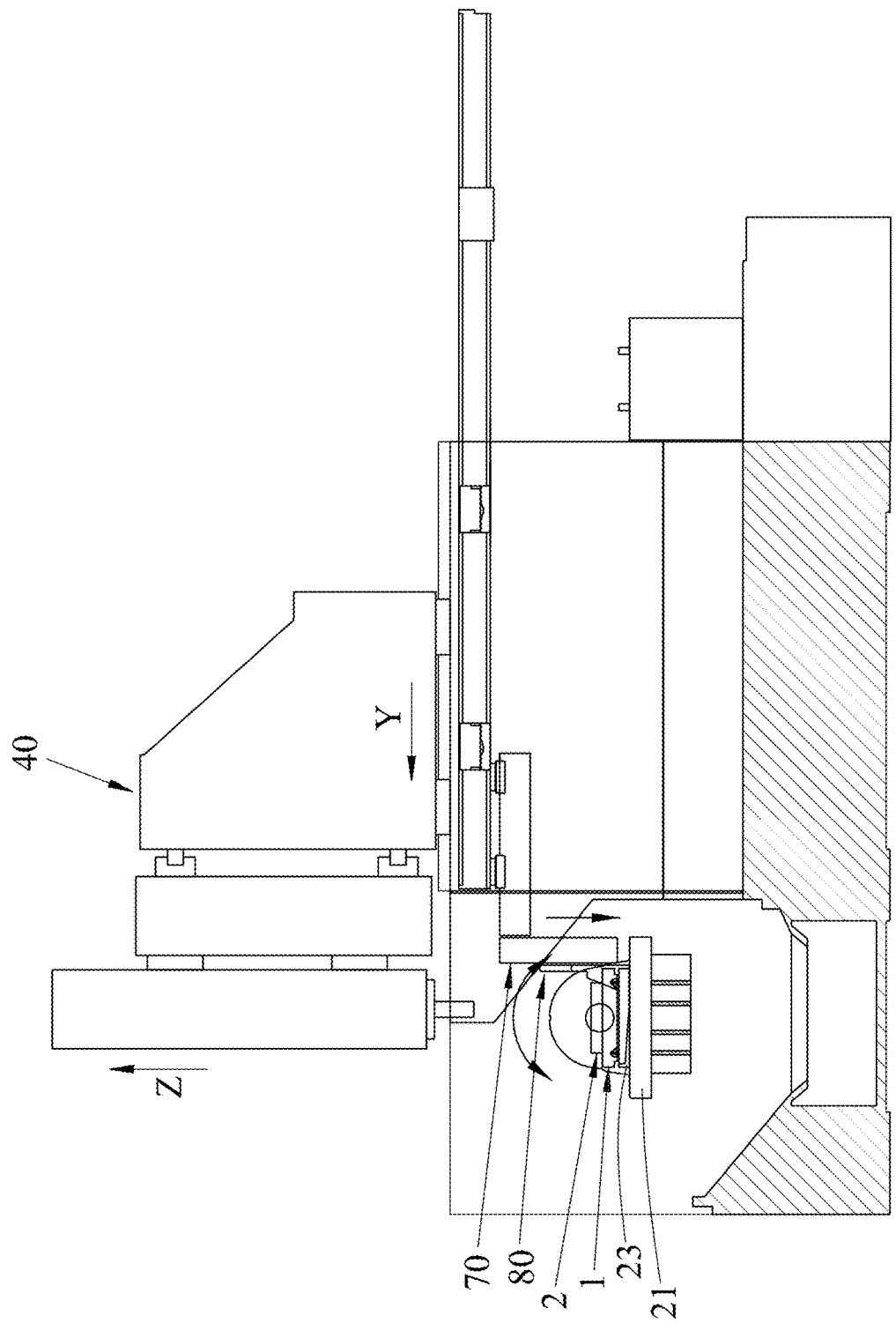
FIG. 8 is yet another sectional side view illustrating the loading seat being driven by the second driving unit to move such that the workpiece pallet is disposed on the work table.

Afterward, as shown in FIG. 8, the second driving unit 70 is operated to move the loading seat 80 from the upper position to the lower position, such that the workpiece pallet 1 is disposed on the work table 23, and the positioning protrusions 232 of the work table 23 are engaged with the corresponding positioning holes 102 of the workpiece pallet 1 (as shown in FIG. 9).

Figure 11:
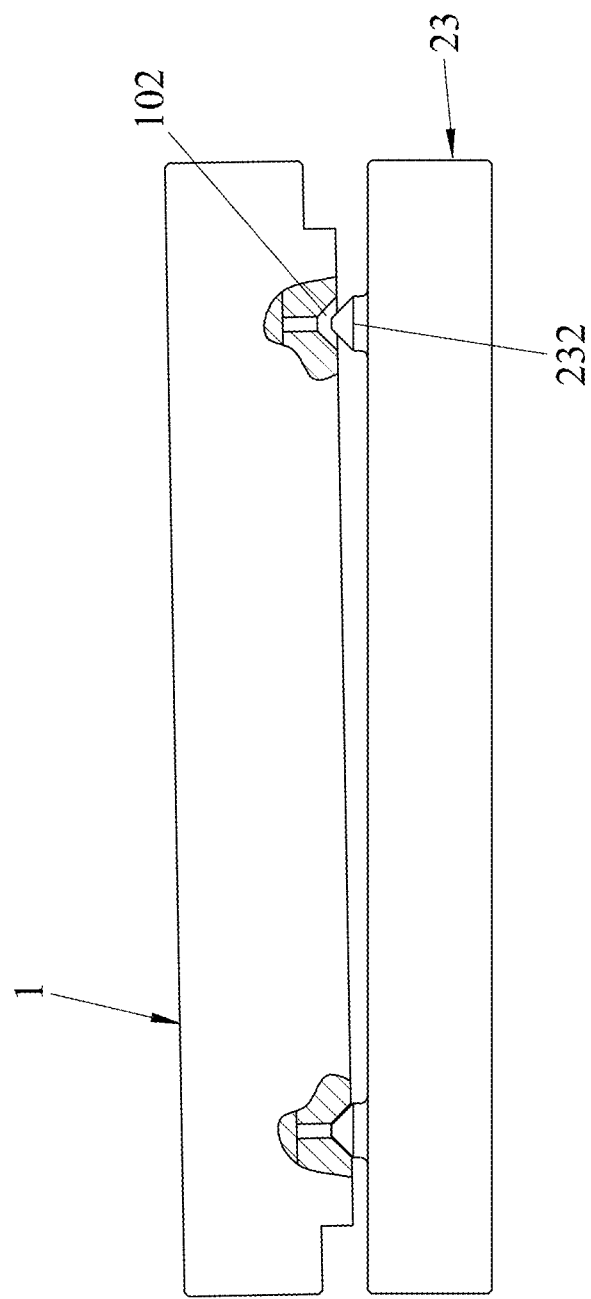
FIG. 11 is another partly sectional side view of the workpiece pallet and the work table, illustrating a misengagement between the workpiece pallet and the work table.

As mentioned hereinbefore, since the base seat 21 is already rotated about the first axis (L1) to compensate for the deformation of the bearing portion 82 of the loading seat 80, mis-engagement between the positioning protrusions 232 of the work table 23 and the corresponding positioning holes 102 of the workpiece pallet 1 (as shown in FIG. 11) can be avoided.

Finally, when the workpiece pallet 1 is stably disposed on the work table 23 of the work table unit 20, the sliding unit 40 may be operated to machine the workpiece 2. At the same time, the second driving unit 70 may be operated to move the loading seat 80 from the lower position to the upper position, and the first driving unit 50 may be operated to move the loading seat 80 back to the default position for the next transferring and machining processes.

Therefore, by virtue of the aforementioned configurations and collaborative movements the first driving unit 50, the conveying member 60, the second driving unit 70 and loading seat 80, the machining center of the present disclosure is capable of transferring each of the workpiece pallets 1 via a linear motion, so that the present disclosure may have a more compact size in comparison to the prior art.

Although the sensor unit 90 in the first embodiment of the disclosure is configured to sense and measure the deformation of the bearing portion 82, the sensor unit 90 may be configured to sense and measure weights in other embodiments.

Figure 12:
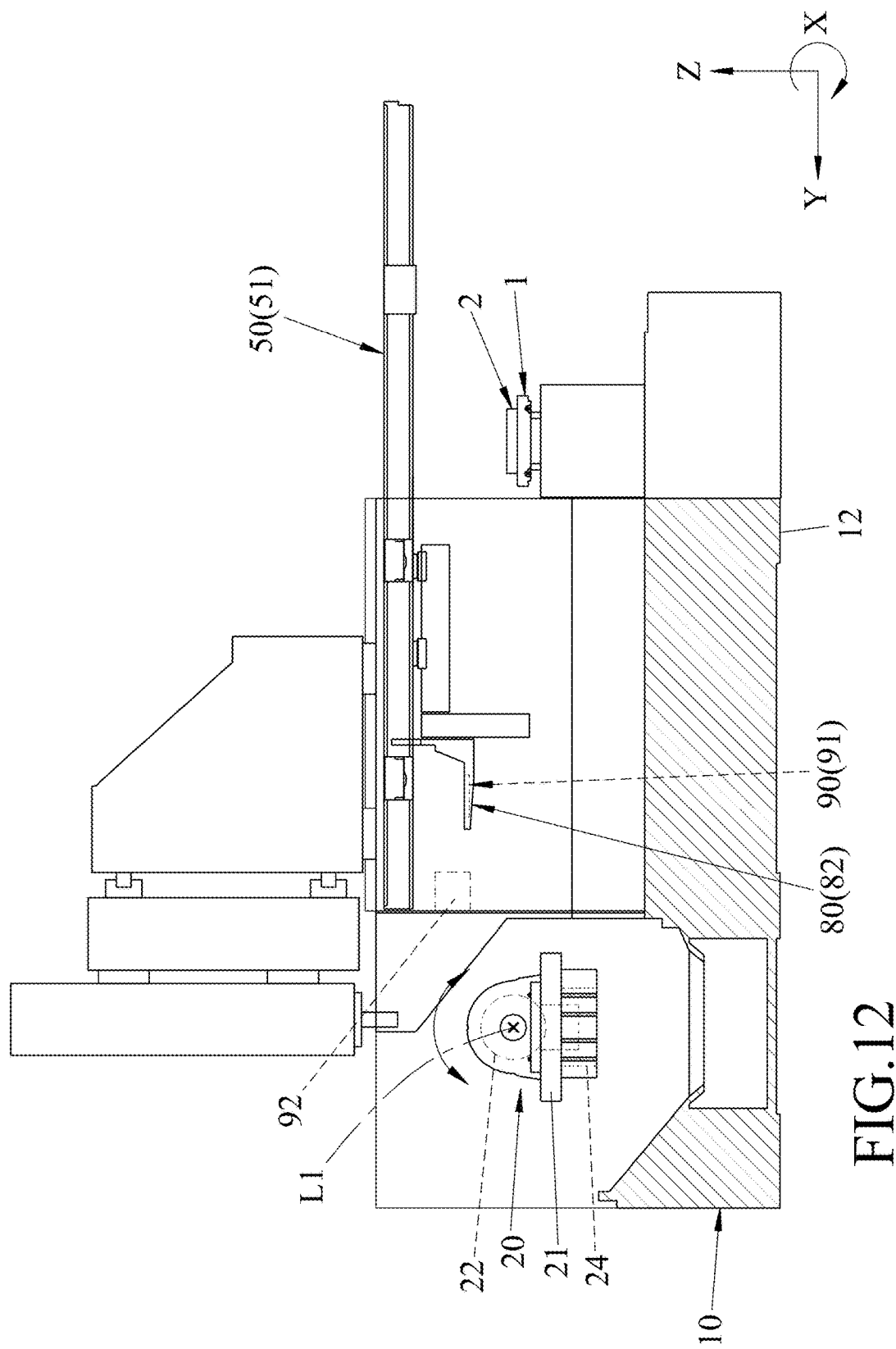
FIG. 12 is a sectional side view illustrating the workpiece, the workpiece pallet and a second embodiment of the machining center according to the present disclosure.

For example, referring to FIG. 12, the sensor unit 90 of a second embodiment of machining center according to the disclosure also includes the sensor 91 and the control module 92. The sensor 91 is mounted to the bearing portion 82 of the loading seat 80 for measuring a sum of weights of one of the workpiece pallets 1 and at least one of the workpieces 2. The control module 92 is electrically connected to the sensor 91 and the first rotary driver 22 of the work table unit 20, and has built-in matching data that matches the sum of weights to a corresponding value of the deformation of the bearing portion 82 relative to the bottom surface 12.

The sensor 91 is capable of sending a signal of the sum of weights to the control module 92, so that the control module 92 controls the first rotary driver 24 to actuate the rotation of the base seat 21 of the work table unit 20 about the first axis (L1) in accordance with the value of the deformation.

For example, given a sum of weights, W1, the control module 92 is able to match W1 to a corresponding value of the deformation with a corresponding angle of deviation, $\theta1$. Then, the control module 92 may control the first rotary driver 24 to rotate the base seat 21 by the angle of deviation, $\theta1$, about the first axis (L1) relative to the machine bed 10.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A machining center comprising:
   a machine bed having
      a top surface,
      a bottom surface that is opposite to said top surface,
      a machining zone that is defined between said top and bottom surfaces,
      a transferring zone that is defined between said top and bottom surfaces, said machining zone and said transferring zone being arranged in a first direction, and
      a gate that is disposed between said machining and transferring zones;
   a work table unit mounted in said machining zone of said machine bed;
   a sliding unit mounted to said top surface, being slidable along a first sliding axis which extends in the first direction, and including a tool spindle that is movably disposed above said work table unit;
   a first driving unit mounted in said transferring zone and extending in the first direction;
   a conveying member disposed between said first driving unit and said bottom surface of said machine bed, and movably mounted to said first driving unit;
   a second driving unit co-movably mounted to said conveying member; and
   a loading seat movably mounted to said second driving unit;
   wherein said first driving unit is operable for driving said conveying member to move along a conveying axis which extends in the first direction, thereby driving said loading seat to move along first adjusting axes which extend in the first direction between said transferring and machining zones via said gate; and
   wherein said second driving unit is operable for driving said loading seat to move along second adjusting axes which extend in a second direction, which are perpendicular to the first direction, and which are substantially vertical.

2. The machining center as claimed in claim 1, wherein said work table unit includes:
   a base seat having a shaft that is rotatably mounted to said machine bed and that extends along a first axis extending in a third direction which is perpendicular to the first and second directions;
   a first rotary driver operable for rotating said shaft of said base seat about the first axis, thereby driving said base seat to rotate about the first axis relative to said machine bed;
   said work table co-rotatably mounted to said base seat; and
   a second rotary driver operable for driving said work table to rotate relative to said base seat about a second axis which extends substantially in the second direction.

3. The machining center as claimed in claim 2, wherein:
   said loading seat is L-shaped, and has an upstanding portion that is movably mounted to said second driving unit, and a bearing portion that is transverse to said upstanding portion;
   said machining center further comprises a sensor unit that includes
      a sensor mounted in said transferring zone of said machine bed for measuring a deformation of said bearing portion toward said bottom surface, and
      a control module electrically connected to said sensor and said first rotary driver of said work table unit; and
   said sensor is capable of sending a signal of the deformation to said control module, so that said control module controls said first rotary driver to actuate the rotation of said base seat of said work table unit about the first axis in accordance therewith.

4. The machining center as claimed in claim 2, wherein said work table has a top end surface, and a plurality of positioning protrusions connected to said top end surface and adapted to be engaged with positioning holes of a workpiece pallet which are formed in a bottom end surface of the workpiece pallet when the workpiece pallet is disposed on said work table.

5. The machining center as claimed in claim 4, wherein:
   said loading seat is L-shaped, and has an upstanding portion that is movably mounted to said second driving unit, and a bearing portion that is transverse to said upstanding portion;
   said machining center further comprises a sensor unit that includes
      a sensor mounted to said bearing portion of said loading seat for measuring a sum of weights of a workpiece pallet and at least one workpiece; and
      a control module electrically connected to said sensor and said first rotary driver of said work table unit, and having built-in matching data that matches the sum of weights to a corresponding value of the deformation of said bearing portion relative to said bottom surface; and
   said sensor is capable of sending a signal of the sum of weights to said control module, so that said control module controls said first rotary driver to actuate the rotation of said base seat of said work table unit about the first axis in accordance with said value of the deformation.

* * * * *